United States Patent Office 3,362,682
Patented Jan. 9, 1968

3,362,682
HYDRAULIC TENSIONING HEAD FOR ANCHORING OR TIE BOLTS
Gunter Meschonat, Holsteiner Strasse 10, Dortmund, Germany, and Gunter Kotting, Kampenstrasse 82, Herbede-Kampen, Witten, Germany
Filed Aug. 18, 1966, Ser. No. 573,244
Claims priority, application Germany, Aug. 26, 1965, K 56,981
3 Claims. (Cl. 254—29)

ABSTRACT OF THE DISCLOSURE

An hydraulic tensioning head for tensioning a tie bolt is provided with a spacing sleeve, which surrounds the tie bolt and bears against a firm foundation. Upon the spacing sleeve and above the nut to be tightened is a tensioning ring against which bear hydraulic pistons carried by a separate head. Recessed in the head is an axially split nut, the parts of which are spring urged apart, and this nut is adapted to engage a threaded portion of the tie rod. Hydraulically operated radial plungers bear against the parts of the nut. First the radial plungers are forced into engagement with the tie rod and then the pistons are pressurized, thus to tension the tie rod and enable tightening of the tie rod nut.

---

Figure 1:
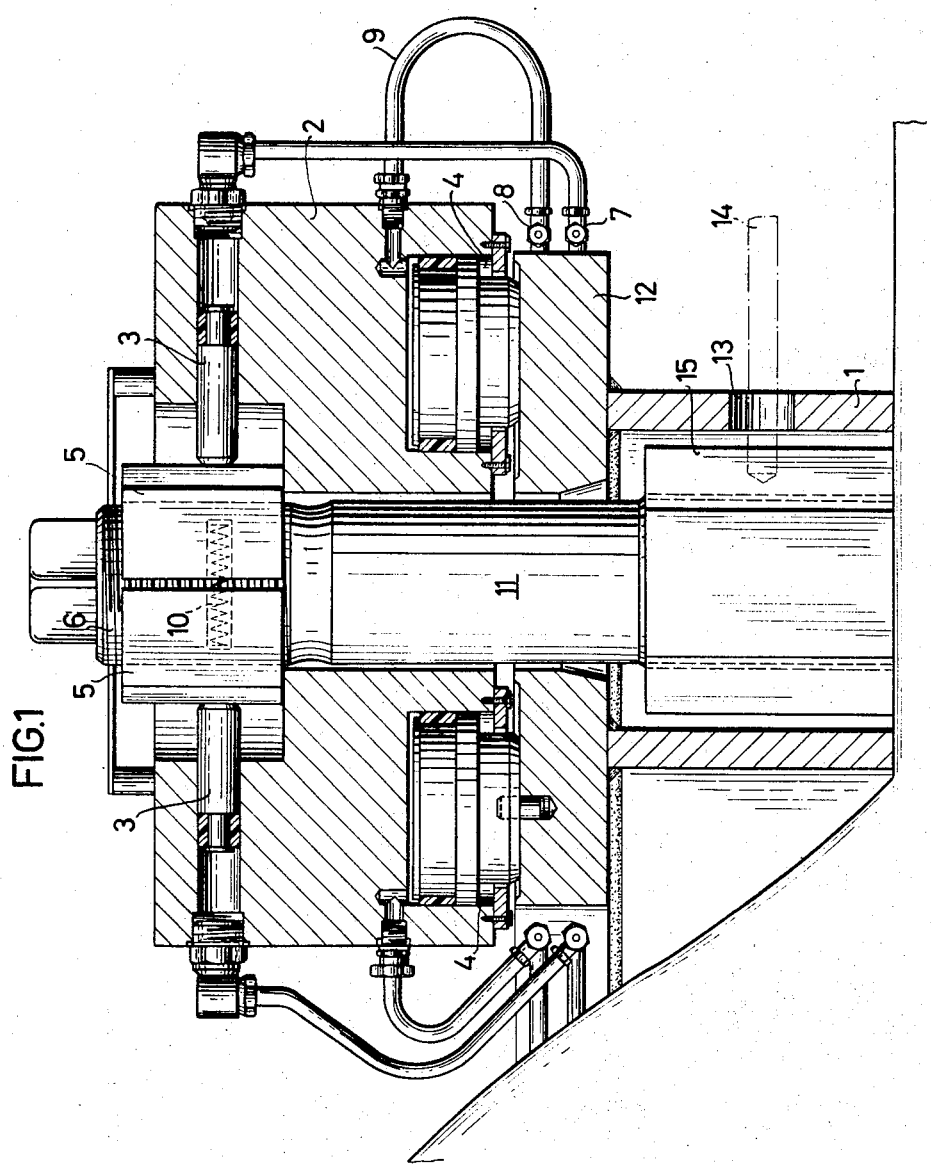

It is well known that when tightening the nuts on anchoring or tie bolts an appreciable proportion of the torque is applied to the shaft of the rod or bolt in the form of torsional stress and that this considerably weakens the shaft. Various devices have already been proposed which permit anchoring or tie bolts first to be tensioned and the tension then to be transferred to the nuts. More particularly, hydraulic tensioning heads have been proposed which comprise a tensioning cylinder which tensions the threaded end of the anchoring or tie bolt by acting on a tensioning nut, and which bears on the face of the machine part alongside the nut to which the load is thereafter transferred.

However, these devices do have shortcomings. More particularly, the time needed for their manipulation is long. The piston rod of the tensioning cylinder must first be screwed onto the end of the anchoring or tie bolt and the length of the engaging threads must be sufficient to prevent the flights of the thread from being overloaded and, not until this has been done, can the hydraulic pressure be applied to the piston. Particularly when high tensile forces are to be applied by the hydraulic pressure of a highly pressurized oil it takes a fairly long time before the required tension has been actually applied to the anchoring or tie bolt because of the resultant elastic elongation.

The long time it takes to operate known types of tensioning heads means that more labor is involved and that overhead costs rise and often it is quite impossible to employ such tensioning heads. Particularly in the operation of nuclear reactors personnel cannot be allowed to spend a long time on tightening up reactor vessels because of the radiation hazard to which they may be exposed.

The object of the present invention is therefore the provision of a tensioning head which does not require the parts of the device to be assembled with a corresponding waste of time before the actual operation of tensioning can begin, and which in operation does not involve waiting for the necessary tension to be established before the permanent nuts can take over.

Substantially the solution proposed by the present invention resides in that the tensioning nut is a split nut axially divided into several parts, preferably into two halves, urged apart by a radially acting expanding force and adapted to be closed around the threaded end of the anchoring or tie bolt, that the tensioning cylinder or cylinders and the hydraulic actuating means of the tensioning nut are connected to oil pressure pumps adapted to change over from low to high pressure pumping in response to the pressure build-up and that said two oil pressure pumps are themselves connected in series through a pressure-responsive change-over valve.

According to this arrangement the tensioning nut need not be specially screwed onto the threaded end of the anchoring or tie bolt or of the piston rod of the tensioning cylinder because engagement of the nut and the threaded end is hydraulically effected, the necessary grip being first generated by the application of low pressure followed by high pressure. Since the two oil pressure pumps are connected in series through a pressure-responsive change-over valve the tensioning nut is first operated to engage the thread by the application of low pressure so that the necessary clearances are quickly traversed, the low pressure being then applied to the tensioning cylinder or cylinders before the pressure-responsive change-over from low to high pressure occurs and the tensioning nut is made to grip under the high pressure followed by the application of the high pressure to the tensioning cylinder or cylinders, this sequence of operation resulting from the pressure-responsive serial connection of the two oil pressure pumps.

Apart from the possibility of mounting the entire tensioning head in its correct initial position on one or more tie bolts by a single simple manipulation, the proposed tensioning head has the further advantage that the clearances which must be traversed for connecting the head to the threaded end of the anchoring or tie bolt and the relatively considerable elongations which occur when the tensile force is initially applied can be rapidly taken up by the admission of low pressure to the tensioning cylinder and the hydraulic actuation of the tensioning nut before the high pressure is applied.

The time required for applying the required tension can thus be decisively reduced, labor cost saved and the tensioning head used more particularly on nuclear reactor vessels in the vicinity of which personnel are exposed to a radiation hazard.

In one practical embodiment of the invention the parts of the tensioning nut are radially movably contained adjacent the sides of the anchoring or tie bolt in a body containing the tensioning cylinder or cylinders, the parts of the nut being urged radially outwards by springs against which they are closable by pressurized radial actuating cylinders to grip the threaded end of the anchoring or tie bolt. This permits the nut to be mounted with axial and radial freedom of movement to ensure that the nut and the threads on the end of the anchoring or tie bolt can cleanly engage without applying undesirable axial loads to the radial cylinders.

A particularly compact form of construction which is particularly suitable for tensioning a plurality of anchoring or tie bolts situated on a common pitch circle results if, according to another feature of the invention, a tensioning ring is located above the permanent nut or nuts and supported by spacing sleeves embracing said nut or nuts, said ring carrying the oil pressure pumps which are connected by high pressure pipe means to the tensioning and the radial cylinders in the tensioning head.

Figure 2:
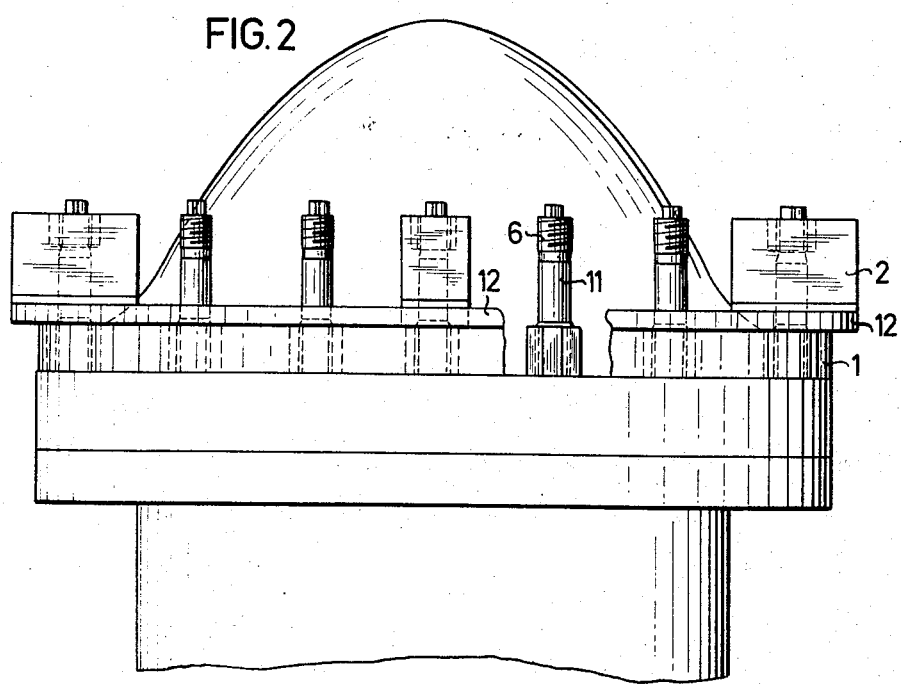
Figure 3:
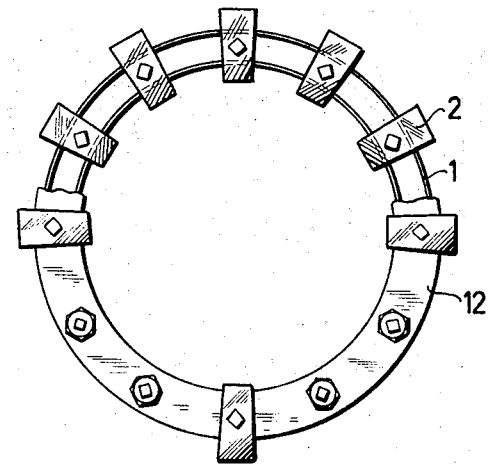

In order to facilitate an understanding of the nature of the invention a non-limitative embodiment will be hereinafter described by reference to the drawings in which FIGURE 1 is an axial section of a bolt and of a hydraulic tensioning head according to the invention, all those parts which are unnecessary for an understanding of the invention being omitted;

FIGURE 2 is a side elevation of the cover plate of a nuclear reactor vessel with a tensioning head according to FIGURE 1 mounted thereon; and FIGURE 3 is a plan view of the arrangement shown in FIGURE 2.

A tie bolt 11 with a threaded end carries one or more permanent nuts 15 which are intended to maintain a given amount of tensile stress in the bolt 11. The device which will be hereinafter described is designed to generate the tensile stress. The embodiment illustratively shown in the drawing comprises a tensioning ring 12 above the permanent nut or nuts. Spacing sleeves 1 attached to the ring embrace the nut or nuts. The sides of the sleeves are provided with openings 13 through which a spanner or like tool can be introduced. In the illustrated embodiment this has the form of a tommy bar 14 which can be fitted into a cooperating hole in the nut 15. When the bolt has been tensioned this permits the nut 15 to be turned to take up the slack until the tensile load can be transferred to the nut 15.

The tensioning ring 12 is provided with pipe connections 7 and 8 for oil pressure pumps not shown in the drawing. The high pressure pipes from the connections 7 and 8 comprise a pipe 9 which in the illustrated embodiment leads to several tensioning cylinders 4 and other pipes which from the connection 7 lead to a plurality of radial cylinders containing plungers 3.

Located within a recess inside a body 2 which contains the tensioning cylinders 4 as well as the radial cylinders and their plungers 3, is a split nut, which in the illustrated embodiment has two parts embracing the threaded extended end 6 of the bolt 11. The halves of the split nut 5 are urged radially outwards by two springs 10. They can therefore be pressed inwards by the plungers 3 of the radial cylinders to grip the threaded end 6 of the bolt 11.

The oil pressure pumps which are connected in a manner not shown in detail to the pipe connections 7 and 8 are understood to be high pressure pumping sets which may be operated by compressed air in such a way that by regulating the air pressure on the primary side of the pumps by means of a reducing valve the hydraulic output pressure which is applied to the plungers in the above mentioned cylinders can be controlled. As illustrated, the cylinders are made pressure-tight by special packings. The oil pressure pumps which are severally associated with the radial cylinders and the tensioning cylinders are connected on their primary sides in series through pressure-controlled change-over valves.

For tightening the nut 15 or several such nuts simultaneously the above described tensioning head shown in the drawings is mounted over the end of the bolt in the manner which will be understood from the drawings. Low pressure oil is first admitted into the radial cylinders causing the plungers 3 to press the two halves of the split nut 5 together. This is done rapidly. The split nut therefore grips the threads in the extension end 6 of the bolt against the resistance of the expanding springs 10.

As soon as the two halves of the split nut have thus closed around the threaded end 6 of the bolt 11 a pressure-responsive change-over valve opens the primary side of the second oil pressure pump which feeds the connection 8. Low pressure is therefore now applied to the plungers 4 of the tensioning cylinders. The pressure in these cylinders therefore operates to separate the body or bodies 2 from the tensioning ring 12 by the amount of clearance provided, and to press the bodies against the underside of the split tensioning nut 5, the plungers 4 bearing against the tensioning ring 12, which is itself supported by the main structure of say the pressure vessel of a reactor. This operation is likewise in rapid motion. Relative motion under low pressure will therefore ensue between the plungers 3 in the radial cylinders and the cooperating faces of the halves of the split nut 5 until the clearance between the body 2 and the tensioning nut 5 has been completely taken up.

A further pressure-responsive change-over valve now first changes the oil pressure pump associated with connection 7 to high pressure operation, causing the two halves of the split nut 5 to be tightly compressed by the plungers 3. Owing to the pressure-responsive serial connection of the oil pressure pumps which feed the connections 7 and 8, respectively, the change-over to high pressure operation of the latter pump for applying high pressure to the plungers 4 in the tensioning cylinders, and for thereby hydraulically tensioning the bolt or bolts 11, is automatic. When the full tensioning thrust has thus been applied, the nuts 15 can be rotated as previously described to take up the slack.

It should be noted that in the event of a sudden pressure collapse in the high pressure system, for instance due to sudden leakage loss, the oil pressure pumps automatically start up to compensate the pressure loss.

When the required tension has been thus applied, hydraulic release may be effected by manual valves. This should again be done in the above sequence, the tensioning cylinders containing the axial plungers 4 being exhausted first and then the radial cylinders containing the radial plungers 3.

The expanding springs 10 will operate to re-open the split nut 5 thus permitting the entire tensioning head to be lifted off and removed.

It will be understood from the above explanations that the described device could be used with equal advantage for simultaneously tightening individual and a plurality of anchoring or tie bolts pitched for instance on a common circle.

What we claim is:

1. In an hydraulic tensioning head for tensioning an outwardly projecting tie rod provided with a nut to be tightened and a threaded end portion, the improvement comprising a spacing sleeve loosely encircling a portion of the tie rod and the nut, a tensioning ring on the upper end of said spacing sleeve above the nut and through which the tie rod freely passes, a head above said tensioning ring and free therefrom and through which the tie rod extends freely, tensioning pistons in the lower portion of said head for exerting pressure against the adjacent face of said tensioning ring, an axially split nut for embracing the threaded end portion of the tie rod recessed in said head, radial plungers in said head bearing against the parts of said split nut respectively, and hydraulic actuating means for said tensioning pistons and radial plungers whereby pressurized hydraulic fluid is supplied first to said radial plungers and then to said tensioning pistons.

2. The organization as claimed in claim 1, comprising springs urging parts of the split nut away from each other to enable the same to be quickly applied to and removed from the tie rod, and an access opening in said spacing sleeve to enable actuation of the nut to be tightened.

3. The organization as claimed in claim 1 in which said hydraulic actuating means comprises pipe connections extending from said tensioning ring to said head.

References Cited

UNITED STATES PATENTS

| | | | |
|---|---|---|---|
| 3,008,362 | 11/1961 | Tucker | 81—54 |
| 3,015,975 | 1/1962 | Biach | 81—54 |
| 3,115,332 | 12/1963 | Singleton et al. | 254—29 |
| 3,128,990 | 4/1964 | Brooks et al. | 254—29 |

MILTON S. MEHR, *Primary Examiner.*